UNITED STATES PATENT OFFICE

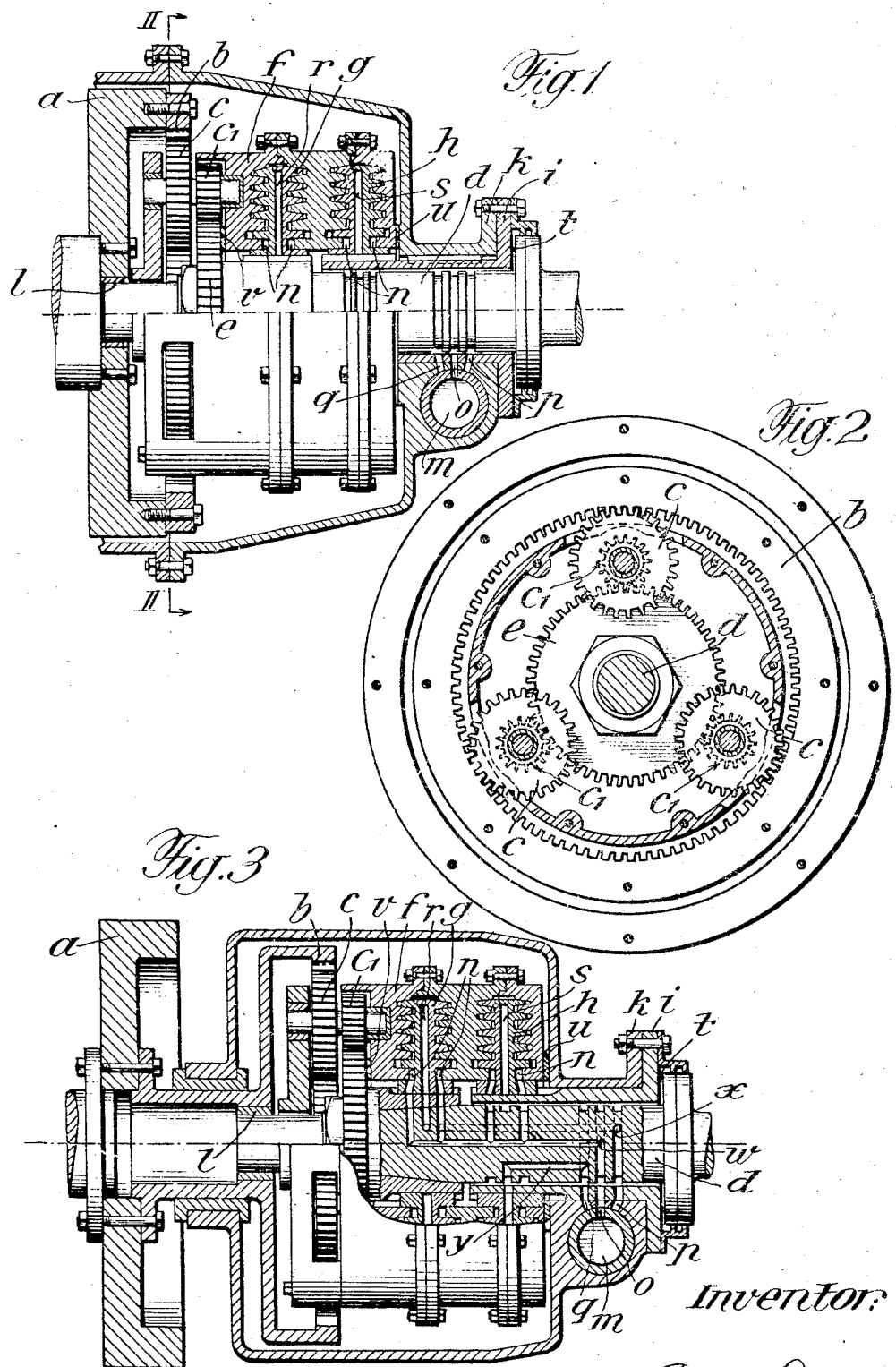

ALFRED DÜRIG, OF WINTERTHUR, SWITZERLAND, ASSIGNOR TO FIRM SCHWEIZ LOKO-MOTIV- & MASCHINENFABRIK, OF WINTERTHUR, SWITZERLAND

REVERSING GEAR COMPRISING PRESSURE OIL OPERATED CONTROL COUPLINGS PARTICULARLY FOR SHIPS' DRIVES

Application filed March 25, 1932, Serial No. 601,254, and in Germany April 9, 1931.

This invention relates to reversing gears comprising pressure oil operated control couplings, particularly for ships' drives.

Reversing gears of this type including orbitally moving gear wheels, a driving and a driven shaft in coaxial relation, and two couplings arranged on either side of the gear wheels, are known. To most of these known gearings the drawback is inherent, particularly from the point of view of the ship builder, that the length of the gearing is too great, thus requiring too much space.

According to this invention a compact construction and a short length of the reversing gear comprising pressure oil operated control couplings for example in the form of friction clutches arranged between a driving part and a driven part is provided by accommodating the two couplings directly side by side in a mounting member for the oribitally moving gear wheels. The control position for this gear or the control valve for actuating the two couplings thereof respectively as well as the control instruments may be disposed remote from the gear viz. in any part of the ship.

In the accompanying drawing two constructional forms of the invention are illustrated by way of example only in which Fig. 1 shows an axial section of a first form of a reversing gear, Fig. 2 is a front view of Fig. 1, and Fig. 3 is an axial section of a modified form of the gear.

Referring to Fig. 1 of the drawing, to the part $a$ of the driving motor of the gear i. e. the fly-wheel of the motor a driving toothed rim $b$ provided with internal gear teeth is directly secured or, as shown in Fig. 3, by means of an intermediate member, and operatively associated with three or more pairs of orbital gear wheels, $c$, $c'$ of an epicyclic gear. The gear wheels $c$ engage in the toothed rim $b$, whereas the gear wheels $c'$ are in mesh with the spur gear wheel $e$ fixed to the propeller shaft $d$. The propeller shaft $d$ is mounted at one end of the gearing in a sleeve $i$ and at the other end adjacent the crank shaft of the driving motor in a sleeve $l$. The two pressure oil operated couplings $g$ and $h$ constructed as friction clutches are built in a mounting $f$ which is in the form of a drum and which carries also the different pairs of gear wheels $c$, $c'$. The clutch $g$ for forward movement is connected with the propeller shaft $d$, whereas the clutch $h$ for rearward movement is secured to the sleeve $i$, surrounding the propeller shaft. The sleeve $i$ is screwed to a stationary casing $k$ which is directly connected to the motor frame (Fig. 1) or else mounted independently of said frame as shown in Fig. 3.

An oil pump, not shown, driven by the motor supplies the pressure oil for effecting the shifting operation of the clutches through a connecting piping leading to a cock-valve $m$. This cock-valve is so constructed that the releasing spaces $n$ in the clutches $g$ and $h$ remain connected with the pressure-oil space of the cock $m$ via the passages $w$ in the shaft $d$ and the passage $o$ in the positions of the cock valve corresponding to the gearing running idle, driving forwardly or backwardly respectively. By turning the cock-valve $m$ in the respective positions, the pressure-oil can be so controlled that it flows either through the bore $p$ and the passage $x$ in the shaft $d$ to the pressure space $r$ of the clutch $g$ or through the bore $q$ and the passage $y$ in the shaft $d$ to the pressure space $s$ of the clutch $h$, whereby selectively the one or other clutch is put in. In order to provide an effective pressure oil lubrication for the bearing faces $t$, $u$ and $v$ which are alternately rendered operative in dependency on the direction of rotation, for transmitting the torque required for the propeller, these faces are arranged to communicate with the bores $p$ and $q$ and thus automatically pressure applied thereto incidentally to the respective clutch being put in and maintained under pressure. Relative movement at $v$ takes place only when the gearing is driving backwardly.

I claim:

1. In a reversing gear, in combination, a drive shaft and a driven shaft coaxially disposed to each other, an epicyclic drive intercalated between said two shafts, a mounting member for the orbital gear wheels of said epicyclic drive, surrounding said driven shaft, two pressure oil operated control friction clutches arranged side by side in crowded relation in said mounting member and adapted for respectively coupling said mounting member to said driven shaft and a stationary portion of the gear, bearing surfaces provided between said mounting member and said driven shaft and said member and said stationary portion of the gear for transmitting the torque to said driven shaft in its respective direction of rotation, a valve for the pressure oil for selectively connecting said clutches for driving the driven shaft in either direction, and pressure oil passages interconnecting said valve and said bearing surfaces for automatically lubricating the respective surfaces when the related clutch is connected.

2. In a driving arrangement comprising a driving motor and a reversing gear in an axially crowded assembly, in combination, a fly-wheel provided on the drive shaft of the driving motor, an interiorly toothed rim arranged on said fly-wheel and constituting an outer wheel for an epicyclic gear, a driven shaft coaxially disposed to said drive shaft, a central gear wheel for said epicyclic gear fixed to said driven shaft, a mounting member for the orbital gear wheels of said drive surrounding said driven shaft, two pressure oil operated control friction clutches arranged side by side in crowded relation in said mounting member and adapted for respectively coupling said mounting member to said driven shaft and a stationary portion of the gear, and control means for the pressure oil for selectively connecting said clutches for driving the driven shaft in either direction.

3. In a reversing gear, in combination, a drive shaft and a driven shaft coaxially disposed to each other, an epicyclic drive intercalated between said two shafts, a mounting member for the orbital gear wheels of said epicyclic drive carrying said gear wheels interiorly with parts of their toothed rims projecting out of the member, two pressure oil operated control friction clutches arranged side by side inside said mounting member in a compact, sturdy assembly with said orbital gear wheels and adapted for respectively coupling said mounting member to said driven shaft and a stationary portion of the gear, and control means for the pressure oil for selectively connecting said clutches for driving the driven shaft in either direction.

4. In a reversing gear, in combination, a drive shaft and a driven shaft coaxially disposed to each other, an epicyclic drive intercalated between said two shafts, a mounting member for the orbital gear wheels of said epicyclic drive carrying said gear wheels interiorly with parts of their toothed rims projecting out of the member, two pressure oil operated control friction clutches, arranged side by side inside said mounting member in a compact, sturdy assembly with said orbital gear wheels and adapted for respectively coupling said mounting member to said driven shaft and a stationary portion of the gear, a control valve for the pressure oil adjoining said driven shaft, and conducting means for the pressure oil arranged between said valve and said clutches interiorly of said driven shaft and permitting of selectively connecting said clutches by means of said valve with a minimum of length for said conducting means.

5. In a mounting member for reversing gears the combination with a drum-shaped casing adapted for coaxial assembly with a drive part and a driven part of the reversing gear, a stud wheel interiorly disposed in said casing and adapted for fast mounting on one of said parts, bearing means provided in said casing for orbital gear wheels operatively connected with said interior stud wheel and projecting out of said casing with parts of their toothed rims, for cooperation with the other part, two pressure oil operated friction clutches arranged side by side inside said casing in a compact, sturdy assembly with said oribtal gear wheels and adapted for respectively coupling said casing to said driven part and a stationary portion of the gear, and means for the pressure oil conducting means for the pressure oil of said clutches interiorly disposed in said casing and adapted for communication with central control conducting means in said casing for driving the driven part in either direction.

In testimony whereof I have signed my name to this specification.

ALFRED DÜRIG.